United States Patent
Matzner

(10) Patent No.: US 7,204,525 B2
(45) Date of Patent: Apr. 17, 2007

(54) FLOWLINE CLAMP CONNECTOR

(75) Inventor: Mark D. Matzner, Burleson, TX (US)

(73) Assignee: S.P.M. Flow Control, Inc., Fort Worth, TX (US)

( * ) Notice: Subject to any disclaimer, the term of this patent is extended or adjusted under 35 U.S.C. 154(b) by 251 days.

(21) Appl. No.: 11/013,486

(22) Filed: Dec. 16, 2004

(65) Prior Publication Data

US 2005/0242584 A1   Nov. 3, 2005

Related U.S. Application Data

(60) Provisional application No. 60/566,264, filed on Apr. 29, 2004.

(51) Int. Cl.
*F16L 17/00*   (2006.01)
(52) U.S. Cl. .................. 285/367; 285/917; 277/609
(58) Field of Classification Search .................. 285/95, 285/332.2, 367, 917; 277/609, 616, 626
See application file for complete search history.

(56) References Cited

U.S. PATENT DOCUMENTS

| | | | | |
|---|---|---|---|---|
| 2,766,999 A | * | 10/1956 | Watts et al. ............. | 285/334.2 |
| 3,403,931 A | * | 10/1968 | Crain et al. .............. | 285/334.2 |
| 3,554,581 A | * | 1/1971 | Mason et al. ............... | 285/367 |
| 3,680,188 A | * | 8/1972 | Mason et al. ................. | 29/451 |
| 4,218,080 A | * | 8/1980 | Kendrick .................... | 285/347 |
| 6,290,237 B1 | | 9/2001 | Graupner .................... | 277/603 |

OTHER PUBLICATIONS

Two-pages of Grayloc Products, Houston, Texas 77252 showing Grayloc Connectors in Extreme Service.
One page showing 4" Halliburton Big Inch Clamp Connection.

* cited by examiner

*Primary Examiner*—Aaron Dunwoody
(74) *Attorney, Agent, or Firm*—Bracewell & Giuliani LLP

(57) ABSTRACT

A flowline connection assembly connects first and second tubular members to each other. Each tubular member has an external flange on its end. A conical recess is formed in the bore at the end of each of the tubular members. A metal ring has a pair of legs extending in opposite axial directions, each of the legs having a conical outer surface that engages one of the conical recesses. Each ring has an elastomeric seal that seals the recess. A clamp has cam surfaces that engage the flanges and pull the tubular members axially toward each other.

20 Claims, 2 Drawing Sheets

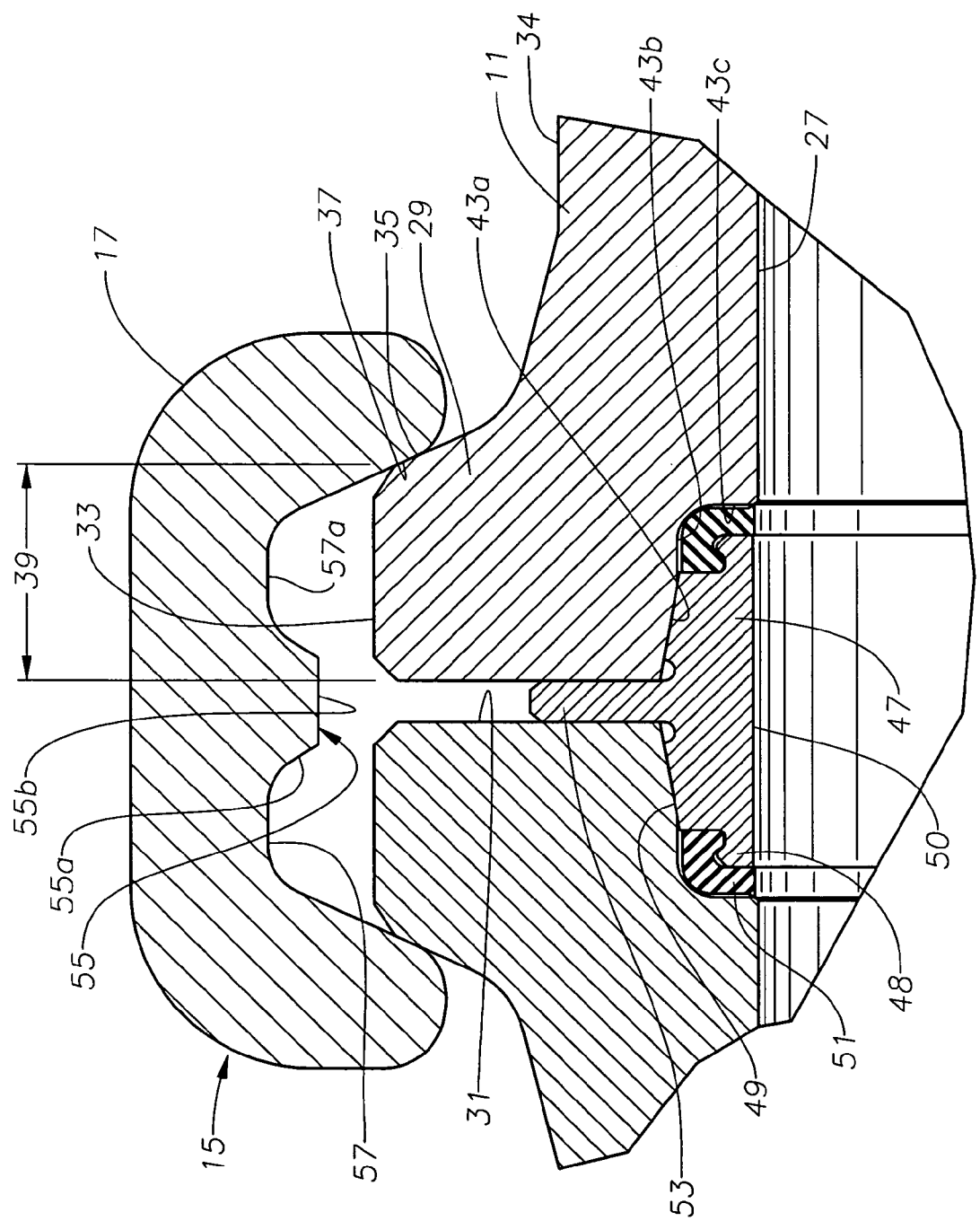

FLOWLINE CLAMP CONNECTOR

CROSS-REFERENCE TO RELATED APPLICATION

This application claims priority to provisional application Ser. No. 60/566,264, filed Apr. 29, 2004.

FIELD OF THE INVENTION

This invention relates in general to oilfield pipe connectors, and in particular to a clamp-type connector for connecting flowlines for well service operations.

BACKGROUND OF THE INVENTION

In some oil field service operations, such as hydraulic fracturing, cementing, acidizing and the like, high pressure fluids are pumped down the well. In some cases, the fluid pressures may be in excess of 15,000 psi. Typically, an operator brings high pressure pumping equipment to the well site and installs temporary service flowlines from the high pressure pumps to the wellhead. Because high volumes of fluid may also be needed, a number of pumping units may be connected together at one well site.

The temporary flowline components include joints or sections of steel pipe of differing lengths, various junctions, valves, swivels and the like. Generally, each well site differs, and the workers have to arrange the flowlines to extend around and past a variety of well site equipment. Many connections have to be made up, and each connection must be able to withstand the high pressure. The workers need to be able to quickly make and break out the connections to minimize the time for each job.

A hammer union is a common type of connector used for these temporary flowlines. The flowline components have ends that abut each other. A collar fits loosely on one end, the collar having internal threads for engaging threads on the end of the other flowline component. The collar has external lugs, and the workers deliver blows to the lugs to tighten the collars. While these hammer union systems work well, there are disadvantages. The larger size components can be fairly heavy, and the ends being joined have to be elevated above the ground to tighten the hammer union. A worker might sustain an injury while lifting the components and delivering blows with a hammer. In very cold climates, the hammer union could shatter or break due to the blows. Sparks can be created by delivering the blows, which could create an explosion if any combustible gas has leaked in the vicinity. The task of connecting the components with a hammer union is time consuming.

Another type of temporary oilfield service flowline uses clamps to clamp the ends of the flowlines together. The workers employ wrenches to secure four bolts that draw the clamp halves together. The clamp engages annular external flanges formed on the ends of the flowline components. A cylindrical seal recess is formed in the bore at the end of each flowline component. The cylindrical recess terminates in a shoulder that is parallel to the end face of the flowline component. A cylindrical metal carrier ring fits within but does not seal to the cylindrical seal recess. Rather a clearance exists between the recess and the carrier ring to facilitate entry of the carrier ring into the recess. Elastomeric seal rings are mounted to the carrier ring to seal against the cylindrical portions and shoulders of the recesses. This type of service flowline avoids the disadvantage of hammer union but is not in wide use.

In the clamp type of temporary flowline mentioned above, the external dimensions of the clamps are fairly large because the external flanges protrude considerably more than the outer diameter of the flowline component. Reducing the size would make setting up the flowlines more convenient because of compactness. However, the high pressure ratings mandate a certain amount of support metal and still must be maintained.

SUMMARY OF THE INVENTION

In this invention, each tubular member end portion has a flange that extends outward relative to a longitudinal axis. An annular recess is formed in the bore at the end of each of the tubular members, each of the recesses having a conical portion. A metal ring has an outward extending rib that locates between end faces of the tubular members. The rib has a pair of legs extending in opposite axial directions from the rib, each of the legs having a conical outer surface that engages one of the conical portions of the recess. Each leg of the metal ring carries an elastomeric seal that seals between the leg and the recess. A clamp has cam surfaces that engage the flanges and pull the tubular members axially toward each other.

In one embodiment, each recess has a cylindrical portion adjacent its end. The elastomeric seals seal against the cylindrical portions of the recesses. Further, the contact of the legs of the ring with the conical portions of the recesses forms secondary metal-to-metal seals to prevent extrusion of the elastomeric seals into the conical portions of the recesses. Preferably the legs of the ring are sized to create an interference contact with the conical portions of the recesses. The dimensions are selected so that the legs of the ring undergo elastic deformation when the connector is made up. During insertion of the ring, the elastomeric seals clear the conical portions of the recesses and only engage the cylindrical portions to avoid damage to the elastomeric seals.

In one embodiment, the assembly is rated for 15,000 psi, and a ratio of the outer diameter of each of the flanges over a diameter of the bore is less than 2.2 and preferably in the range from 1.9 to 2.2. Also, preferably a ratio of the outer diameter over an axial thickness of each of the flanges measured at the outer diameter is less than 10, and preferably less than 8.

BRIEF DESCRIPTION OF THE DRAWINGS

FIG. 3 is a further enlarged view of a portion of the clamp connector of FIG. 1.

DETAILED DESCRIPTION OF THE INVENTION

Figure 1:
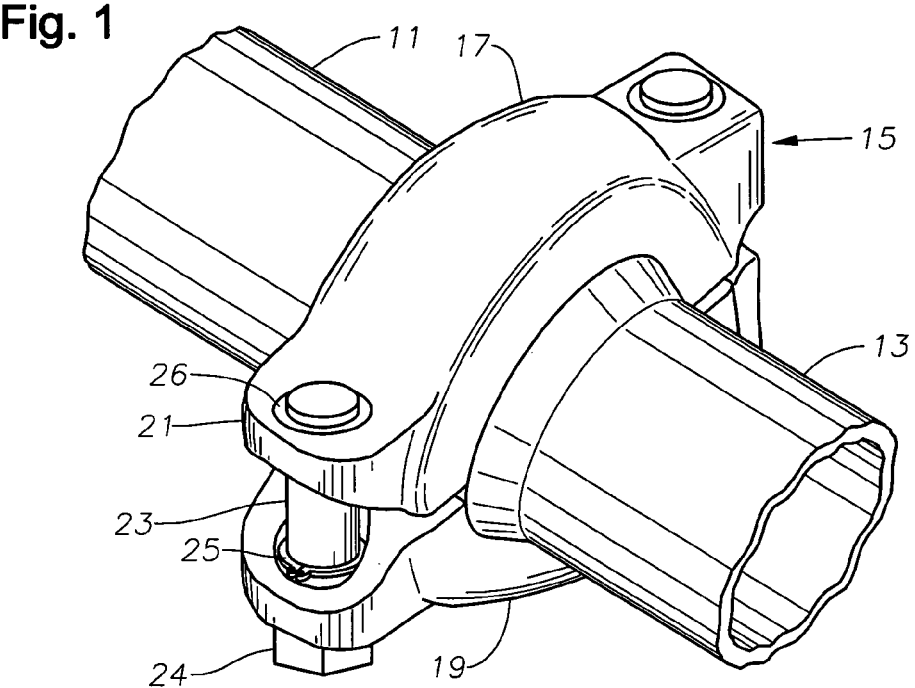
FIG. 1 is a perspective view illustrating a flowline clamp connector constructed in accordance with this invention.

Referring to FIG. 1, two tubular members 11, 13 are shown connected together by a clamp connector 15. Tubular members 11 are conduits that are utilized in oil and gas well service operations. In typical well service operations, the operator brings high capacity pumps to a well site to pump well fluids into the well for various purposes, such as cementing, fracing, acidizing and the like. A number of tubular members 11 are connected to each other to form temporary flowlines from the pumping equipment to the well. Tubular members 11 comprise lengths of straight pipe, tees, ells, adapters, valve ends and the like. The lengths of straight pipe typically range from a few feet to 20 feet, and inner diameters usually are from 2 inches to 4 inches. Connectors 15 allow tubular members 11 to be quickly made up and disassembled. Tubular members 11 must be able to sustain high pressures, in some cases 15,000 psi to 20,000 psi.

Connector 15 is a clamp assembly having two halves or semi-circular portions 17, 19. Each clamp portion 17, 19 has a lug 21 protruding from opposite sides, each lug 21 having a single hole 26. Preferably, holes 26 in lugs 21 in clamp portion 17 are threaded, while holes 26 in clamp portion 19 are not threaded. A fastener, such as a bolt 23, inserts through hole 26 in each lug 21 of clamp portion 19 and engages the threaded holes 26 in lugs 21 of clamp portion 17 to clamp tubular members 11 together. Bolts 23 have heads 24 that have drive surfaces for engagement by a tool, such as a socket of an air impact wrench. Preferably bolts 23 are retained with clamp portion 19 by retention devices, such as a retainer ring 25, such that when detached from clamp portion 17, each bolt 23 is loosely retained with clamp portion 19. Alternately, though not preferred, one bolt 23 could be retained with clamp half 17 and the other with clamp half 19. Another fasteners are feasible, such as bolts that are engaged by nuts.

Figure 2:
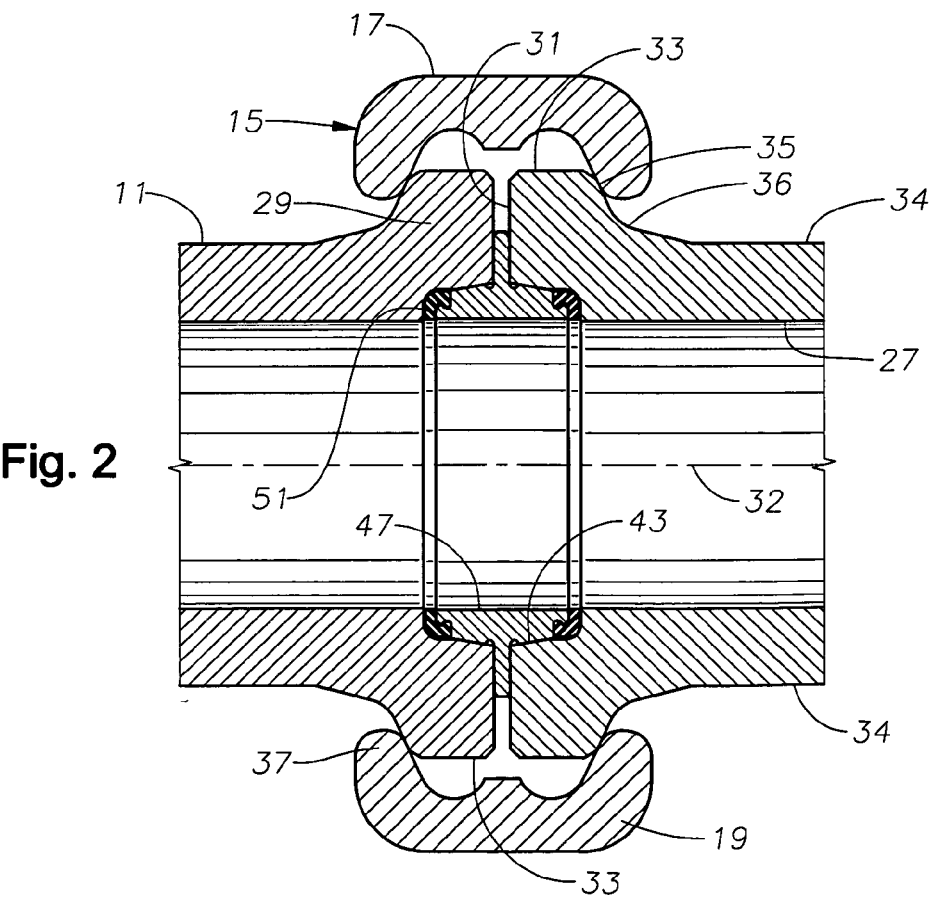
FIG. 2 is a sectional view of the clamp connector of FIG. 1.

Referring to FIG. 2, each tubular member 11 has a bore 27 that is coaxial with the bore of the tubular member to which it is connected. Each tubular member 11 has each end with an external annular flange 29. Tubular member 11 has a flat end face 31 that is perpendicular to longitudinal axis 32 of each tubular member 11. One end of flange 29 extends outward from end face 31. Faces 31 of the adjacent tubular members 11 are closely spaced but not contacting each other. Flange 29 has a cylindrical outer periphery 33 that is larger in diameter than outer periphery 34 of each tubular member 11. Flange 29 has a tapered shoulder 35 that extends from outer periphery 33 of flange 29 at a selected acute angle, about 25 degrees, relative to a plane perpendicular to axis 32. Shoulder 35 is a flat conical cam surface that appears straight when seen in cross-section. Shoulder 35 joins a curved fillet 36 that gradually blends to outer periphery 34 of tubular member 11.

Each clamp portion 17, 19 has a depending wedge 37 that engages tapered shoulder 35 and tapers at the same angle as tapered shoulder 35. Drawing clamp portions 17, 19 toward each other with fasteners 23 causes flanges 29 to move axially toward each other.

Outer periphery 33 of flanges 29 has a relatively small outer diameter compared to prior art type clamp connectors for the same tubular member size. In this embodiment, the ratio of the outer diameter of flange periphery 33 over the inner diameter of bore 27 (FOD/ID) is less than 2.20 and preferably in the range from 1.90 to 2.20. By way of example, the following sizes for 15,000 psi rated tubular members 11 are preferred:

| Bore Diameter | FOD/ID |
|---|---|
| 4 inch | 2.094 |
| 3 inch | 1.917 |
| 2 inch | 2.157 |

The ratio FOD/ID for 3 inch 20,000 psi rated tubular members 11 is less than 2.9 and in one example is 2.792.

In order to make up a loss in support metal due to a reduction in the outer diameter of periphery 33, flange 29 has an axial dimension 39, shown in FIG. 3, that is relatively large compared to prior art clamp connectors. Axial dimension 39 is measured from end face 31 to the junction between outer periphery 33 and tapered shoulder 35. The outer diameter of outer periphery 33 divided by the axial length 39 (OD/AL) is less than 10 and preferably less than 8, but at least 4.0. By way of example, the following sizes for 15,000 psi rated tubular members 11 are preferred:

| Bore diameter | OD/AL |
|---|---|
| 4 inch | 7.05 |
| 3 inch | 4.957 |
| 2 inch | 4.326 |

For 3 inch 20,000 psi rating, the ratio OD/AL is preferably 7.05.

Referring still to FIGS. 2 and 3, bore 27 has a counterbore or recess 43 formed at the intersection with end face 31. Recess 43 has a flat end or shoulder 43c that extends radially outward from bore 27 and joins a cylindrical portion 43b that is concentric with axis 32 (FIG. 2). A large radius or fillet is located at the junction of cylindrical portion 43b and shoulder 43c. A tapered or conical surface 43a joins cylindrical portion 43b and converges outward at a selected angle until reaching end face 31. When viewed in cross-section, tapered surface 43a is at an acute angle relative to axis 32 that is preferably between 8 and 12 degrees and 10 degrees in the preferred embodiment. The junction of conical portion 43a with cylindrical portion 43b is an obtuse angle, as shown in the drawings. Conical portion 43a has a longer axial length than cylindrical portion 43b. In this example, the distance from shoulder 43c to conical portion 43a is approximately 60 percent of the distance from end face 42 to cylindrical portion 43b.

A metal seal ring 47 locates within recesses 43 of two abutting tubular members 11. Seal ring 47 has two legs 48, one of which locates in each of the adjoining recesses 43. Each leg 48 has an outer tapered surface 49 that engages one of the tapered surfaces 43b. Preferably, the engagement of tapered surfaces 43b, 49 is an interference fit that elastically deforms legs 48. tapered surface 49 is slightly larger in outer dimension that tapered surface 43b. Being an elastic deformation, seal ring 47 can be re-used. Seal ring 47 also has an inner diameter 50 that is the same diameter as bore 27. Seal ring 47 has a rib 53 that extends radially outward from a junction with legs 48. End faces 31 abut but do not seal against opposite sides of rib 53.

An elastomeric seal 51 is carried on an end of each leg 48. Each seal 51 is in the general shape of a "J" having one portion that is exposed to bore 27 and another portion that sealingly engages cylindrical recess portion 43b and shoulder 43c. Each seal 51 is trapped between recess portions 43b, 43c and seal ring 47, to form the primary seal for internal pressure in bore 27. In the preferred embodiment, the metal-to-metal engagement of tapered surfaces 43a and 49 forms a secondary seal, but the secondary sealing is optional because the purpose of the metal-to-metal contact is not to seal, rather it is to prevent high pressure causing elastomeric seal 51 to extrude between tapered surfaces 43a and 49. The rating of the secondary metal-to-metal seal is much lower than that of elastomeric seal 51, and the metal-to-metal sealing engagement would not provide the necessary sealing under high pressure in the event of failure of elastomeric seal 51.

Each clamp half 17, 19 has an internal rib 55 located equidistant between the two tapered wedge surfaces 37. Clamp rib 55 has a crest 55b, which defines its inner diameter, and tapered conical flanks 55a extending in opposite axial directions from crest 55b of rib 55. Crest 55b is a cylindrical surface in this embodiment, but it could be rounded. Clamp flanks 55a are defined by a pair of grooves 57 on opposite sides of clamp rib 55. Each groove 57 has a common conical surface with one of the rib flanks 55a, a common conical surface with one of the wedges 37, and a generally cylindrical base 57a. Base 57a could be rounded rather than cylindrical. Curved fillets join base 57a with the conical sides of groove 57.

Each groove 57 has a width or axial extent from the corner junction of rib crest 55b and rib flank 55a to flange 37, measured along a line parallel to the axis of bore 27. The width of groove 57 is greater than the width of crest 55b in this example. The width of crest 55b is only slightly greater than the width of seal rib 53 in this embodiment. The inner diameter of crest 55b is smaller than the inner diameter of groove base 57a by a considerable amount. Preferably, for a 15,000 psi rated connectors 15 with a two or three inch bore 27, the inner diameter of groove base 57a is in the range from 15–20% greater than the inner diameter of clamp rib crest 55b.

In operation, the operator abuts ends of tubular members 11 with seal ring 47 located between end faces 31. The operator places clamp halves 17, 19 around flanges 29 and tightens bolts 23 to draw clamp halves 17, 19 toward each other. The radial movement of clamp halves 17, 19 causes tubular members 11 to move axially toward each other and causes seals 51 to energize and seal against recess 43. The axial movement also causes a metal-to-metal engagement between tapered surfaces 43a and 49. Recess conical surfaces 43a are larger in diameter than the outer diameters of elastomeric seals 51, except near the junction with cylindrical portions 43b. Consequently, during make-up, seals 51 do not slide against much of conical surfaces 43a. Rather seals 51 only slide axially along a small portion of conical surfaces 43a, and cylindrical portions 43b have short axial lengths compared to conical portions 43a. Avoiding extensive axial sliding movement during make-up reduces the possibility of damage to seals 51.

The invention has significant advantages. The use of clamp connectors rather than hammer unions reduces a possibility of accidents due to the use of hammers. The clamp connectors are more quickly and easily assembled than hammer unions. The tapered metal seal surfaces facilitate make-up and prevent extrusion of the primary seals. The elastic deformation of the metal portion of the seal allows repeated re-use. The reduction in outer diameter of the flanges and increase in axial length of the flanges makes the connectors more compact without sacrificing strength.

While the invention has been shown in only one of its forms, it should be apparent to those skilled in the art that it is not so limited but is susceptible to various changes without departing from the scope of the invention.

I claim:

1. A flowline connection assembly, comprising:
   first and second tubular members, each having a bore and an end surrounded by a flange that extends outward relative to a longitudinal axis;
   an annular recess formed in the bore at the end of each of the tubular members, each of the recesses having a conical first portion extending from the end of each of the tubular members at a taper angle and a second portion joining the first portion at an obtuse angle;
   a rigid ring having a pair of legs extending in opposite axial directions, each of the legs having a conical outer surface that engages one of the first portions of the recesses;
   a pair of elastomeric seals, each of the seals being mounted to an end of each of the legs and sealingly engaging the second portion of one of the recesses;
   the engagement of the elastomeric seals with the second portions of the recesses providing a higher pressure rating that any seal formed between the conical outer surface of the rigid ring and the first portions of the recesses; and
   a clamp that has cam surfaces that engage the flanges and pull the tubular members axially toward each other.

2. The assembly according to claim 1, wherein the clamp comprises:
   a pair of clamp halves, each of the clamp halves having an external lug;
   a single hole extending through each of the lugs; and
   a pair of fasteners, each of the fasteners extending from one of the holes of one of the clamp halves into one of the holes of the other of the clamp halves.

3. The assembly according to claim 1, wherein the clamp comprises:
   a pair of clamp halves, each of the clamp halves having an external lug;
   a single hole extending through each of the lugs of the clamp halves, two of the holes being threaded;
   a pair of bolts, each of the bolts extending from one of the holes of one of the clamp halves into one of the holes that is threaded to secure the clamp halves; and
   a retainer ring secured on each of the bolts to retain the bolts with its respective clamp half while unfastened.

4. The assembly according to claim 1, wherein the conical outer surfaces of the legs of the ring are sized to create an interference contact with the first portions of the recesses, the interference fit causing elastic deformation of the legs of the ring.

5. The assembly according to claim 1, wherein the second portion of each of the recesses is cylindrical.

6. The assembly according to claim 1, wherein:
   the taper angle of the first portion of each of the recesses is the same as a taper angle of the conical outer surface of each of the legs.

7. The assembly according to claim 1, wherein:
   the assembly has a pressure rating of at least 15,000 psi;
   the bore has an inner diameter in the range from 2 to 4 inches;
   each of the flanges has an outer diameter; and
   a ratio of the outer diameter over an axial thickness of each of the flanges measured at the outer diameter is in the range from 4.0 to 10.

8. The assembly according to claim 1, wherein:
   the assembly has a pressure rating of between 15,000 and 20,000 psi;
   the bore has an inner diameter in the range from 2 to 4 inches;
   each of the flanges has an outer diameter, and a ratio of the outer diameter of each of the flanges over the inner diameter of the bore is in the range from 1.9 to 2.2; and
   a ratio of the outer diameter over an axial thickness of each of the flanges measured at the outer diameter is in the range from 4.0 to 10.

9. The assembly according to claim 1, wherein:
the assembly is rated for at least 20,000 psi;
the bore has an inner diameter in the range from 2 to 4 inches; and
each of the flanges has an outer diameter, and a ratio of the outer diameter of each of the flanges over the inner diameter of the bore is less than 2.9.

10. The assembly according to claim 1, wherein the angle of the conical portion of each of the recesses is in the range from 8 to 12 degrees.

11. The assembly according to claim 1, wherein the clamp has an internal rib located centrally between the cam surfaces of the clamp and a pair of grooves on opposite sides of the internal rib, and wherein the internal rib has a crest that has a lesser width than a width of each of the grooves, each of the grooves having an inner diameter that is at least 15 percent greater than an inner diameter of the crest.

12. A flowline assembly, comprising:
first and second tubular members;
an end portion on each the tubular members having a bore with a longitudinal axis and an end face perpendicular to the axis;
an external annular flange on each of the end portions, each of the flanges having a tapered cam surface spaced from the end face;
an annular recess formed in the bore of each end portion, the recesses intersecting the end faces and having conical portions extending in opposite directions, the recesses having cylindrical portions spaced from the end faces and joining the conical portions, the cylindrical portions terminating in shoulders that are parallel with and spaced axially from the end faces;
a rigid ring having a pair of legs extending in opposite axial directions, each of the legs having a conical outer surface that engages one of the conical portions of the one of the recesses in an elastic interference fit, each of the conical outer surfaces being at the same taper angle as the conical portion of the recess that it engages;
a pair of elastomeric seals, each mounted to one of the legs of the rigid ring, each elastomeric seal engaging one of the cylindrical portions of the recesses and one of the shoulders to form a seal;
the engagement of the elastomeric seals with the cylindrical portions of the recesses providing a greater pressure rating than any seal formed by the engagement of the conical outer surfaces of the rigid ring with the conical portions of the recesses; and
a clamp that has internal cam surfaces that engage the cam surfaces of the flanges and pull the end faces axially toward each other.

13. The assembly according to claim 12, wherein the clamp has an internal rib located centrally between the cam surfaces of the clamp and a pair of grooves on opposite sides of the internal rib, and wherein the internal rib has a crest that has a lesser width than a width of each of the grooves.

14. The assembly according to claim 13, wherein each of the grooves has a base with an inner diameter that is in the range from 15 to 20 percent greater than an inner diameter of the crest.

15. The assembly according to claim 12, wherein the clamp comprises:
a pair of clamp halves, each of the clamp halves having an external lug;
a single hole extending through each of the lugs of the clamp halves, two of the holes being threaded;
a pair of bolts, each of the bolts extending from one of the holes of one of the clamp halves into one of the holes that is threaded to secure the clamp halves; and
a retainer ring on each of the bolts to retain the bolts with its respective clamp half while unfastened.

16. The assembly according to claim 12, wherein:
the assembly has a pressure rating of at least 15,000 psi, but less than 20,000 psi;
the inner diameter of the bore is from 2 to 4 inches;
each of the flanges has an outer diameter, and a ratio of the outer diameter of each of the flanges over the inner diameter of the bore is in the range from 1.9 to 2.2.

17. A flowline assembly, comprising:
first and second tubular members;
an end portion on each the tubular members having a bore with a longitudinal axis and an end face perpendicular to the axis;
an external annular flange on each of the end portions, each of the flanges having a tapered cam surface spaced from the end face;
an annular recess formed in the bore at the end face of each of the tubular members, each of the recesses having a conical portion that joins a cylindrical portion, the cylindrical portion terminating in a shoulder perpendicular to the axis;
a rigid ring having a pair of legs extending into the recesses in opposite directions; each of the legs having a conical surface formed at a taper angle that is the same as the conical portions of the recesses and being formed to create an interference fit with one of the conical portions;
a pair of elastomeric seals, each of the seals mounted to an end of one of the legs and sealingly engaging the cylindrical surface and shoulder of one of the recesses;
a clamp that has internal cam surfaces that engage the cam surfaces of the flanges and pull the end faces axially toward each other; and
wherein the seal formed by the elastomeric seals has a pressure rating greater than any seal formed by the engagement of the conical surfaces of the legs of the rigid ring with the conical portions of the recesses.

18. The flowline assembly according to claim 17, wherein each of the flanges has an axial thickness, and wherein a ratio of an outer diameter over an axial thickness of each of the flanges measured at the outer diameter is in the range from 4.0 to 10.

19. The assembly according to claim 17, wherein the clamp comprises:
a pair of clamp halves, each of the clamp halves having an external lug;
a single hole extending through each of the lugs of the clamp halves, two of the holes being threaded;
a pair of bolts, each of the bolts extending from one of the holes of one of the clamp halves into one of the holes that is threaded to secure the clamp halves; and
a retainer ring on each of the bolts to retain the bolts with its respective clamp half while unfastened.

20. The assembly according to claim 17, wherein the clamp has an internal rib located centrally between the cam surfaces of the clamp and a pair of grooves on opposite sides of the internal rib, and wherein the internal rib has a crest that has a lesser width than a width of each of the grooves, each of the grooves having an inner diameter at least 15% greater than an inner diameter of the crest.

* * * * *